United States Patent Office 3,399,080
Patented Aug. 27, 1968

3,399,080
PAPER COATED WITH AN INTERPOLYMER OF A MONOETHYLENICALLY UNSATURATED ACID, AN OPEN-CHAIN ALIPHATIC CONJUGATED DIOLEFIN AND AN ALKENYL AROMATIC MONOMER
John F. Vitkuske, Midland, Mich., assignor to The Dow Chemical Company, Midland, Mich., a corporation of Delaware
No Drawing. Continuation-in-part of application Ser. No. 203,695, June 20, 1962. This application Nov. 2, 1966, Ser. No. 591,427
4 Claims. (Cl. 117—155)

ABSTRACT OF THE DISCLOSURE

This application is concerned with paper coated with a continuous adherent dried coating comprising mineral pigment and a binder which has as the principal film-forming constituent, an interpolymer of a monoethylenically unsaturated acid, an open-chain aliphatic conjugated diolefin and an alkenyl aromatic monomer.

---

This invention relates to improved paper coatings. More particularly, it relates to such coated papers using coating compositions based upon latexes of interpolymers prepared from monomeric alkenyl aromatic compounds, diolefins, and carboxylic acids and their derivatives.

This application is a continuation-in-part of U.S. Ser. No. 203,695, filed June 20, 1962, and copending herewith, which was a continuation-in-part of U.S. Ser. No. 657,766, filed May 8, 1957, and now abandoned.

The latexes resulting from the emulsion copolymerization of alkenyl aromatic monomers, such as styrene, and diolefins, such as butadiene, are widely used in coating applications. Their use has been limited to the coating of certain substrata, such as dry walls, fiberboard, wood, and further to interior coatings or at least coatings which are not exposed to weathering and to similar environmental conditions. That limitation results from their water sensitivity, their poor adhesion to substrata, such as steel and other metals, and their inability to air dry to an impermeable, tough coating. However, the copolymer itself is known to possess a variety of properties which should make it ideal for exterior applications. The copolymer has excellent stability to heat, light, and salts and is insoluble in water and aqueous saline solutions. Additionally, the copolymer is inexpensive to prepare from readily available monomeric materials.

Paper coating represents a particularly bothersome coating problem. Not only must the coating be held tenaciously by the paper but the coating must be capable of high speed printing. Thus, the bonding of pigments is of considerable importance.

Accordingly, it is the principal object of this invention to provide an improved coated paper.

It is an additional object to provide such a coated paper having improved printability.

Still another object is the provision of such a coated paper where the coating has improved adhesion and low water sensitivity.

Other objects will be apparent as the description of the invention proceeds.

It has now been found that a coated paper satisfying the above objects may be prepared employing in the coating composition as the principal film-forming constituent an aqueous latex of an interpolymer prepared by the emulsion polymerization of an aliphatic conjugated diolefin, an alkenyl aromatic monomer as more fully defined later, and a monoethylenically unsaturated acid derivative in certain proportions.

As indicated, the interpolymers useful in the present invention are polymers composed essentially of a polymerizable open-chain aliphatic conjugated diene having from 4 to about 9 carbon atoms, a monoethylenically unsaturated acid, and an alkenyl mononuclear aromatic monomer. By the term, open-chain aliphatic conjugated diene having from 4 to about 9 carbon atoms, it is meant to include, typically, butadiene-1,3, 2-methyl-butadiene-1,3, 2,3-dimethylbutadiene-1,3, piperylene, 2-neopentyl-butadiene-1,3, and other hydrocarbon homologs of butadiene-1,3, and, in addition, the substituted dienes, such as 2-chlorobutadiene-1,3, 2-cyanobutadiene - 1,3, the substituted straight chain conjugated pentadienes, the straight and branch chain hexadienes, and others having from 4 to about 9 carbon atoms. The butadiene-1,3 hydrocarbons, because of their ability to produce particularly desirable polymeric materials, are especially advantageous. Butadiene-1,3 which is inexpensive, readily available, and produces interpolymers having excellent properties is preferred.

By the term, alkenyl mononuclear aromatic monomer, it is intended to include those monomers wherein an alkenyl group is attached directly to an aromatic nucleus containing from 6 to 10 carbon atoms. Those monomers are intended to include alkyl- or halo-substituted compounds. Typical of these monomers are styrene, ortho-, meta-, and para-methylstyrene, ortho-, meta-, and para-ethylstyrene, ortho,para-dimethylstyrene, ortho,para-diethylstyrene, para-chlorostyrene, isopropylstyrene, ortho-methyl-para-isopropylstyrene, ortho,para-dichlorostyrene, vinylnaphthalene, and diverse vinyl(alkylnaphthalenes) and vinyl(halonaphthalenes). The term is also intended to include comonomeric mixtures of styrene with α-methylstyrene or one of the above-named alkenyl mononuclear aromatic monomers. Because of their availability and their ability to produce desirable polymers and for other reasons, it is preferred to use styrene or vinyl toluene as the monovinyl aromatic monomer. Up to about 90 percent of the weight of the alkenyl aromatic monomer may be replaced by acrylonitrile to form a quaternary polymer. The acrylonitrile within the stated range has been found to have little effect on pigment binding power, adhesion, or other properties of these polymeric latexes. All attempts to prepare latexes wherein all of the alkenyl aromatic monomer has been replaced by acrylonitrile have been consistently unsuccessful.

The monoethylenically unsaturated acid derivative may be selected from a wide variety of compounds, such as carboxylic acids, sulfonic acids, and anhydrides. It is imperative that the acid derivative be copolymerizable with the other monomers and that it be an acid or hydrolyzable to an acid. Typical examples of these derivatives are itaconic acid, acrylic acid, vinyl sulfonic acid, vinyl benzoic acid, and isopropenyl benzoic acid. Mixtures of two or more such monoethylenically unsaturated acid derivatives may be used if desired.

The diolefin should constitute from 30 to 50 percent by weight of the total weight of monomers used. Less than 30 percent of the diolefin will result in a latex which is non-film-forming. The alkenyl aromatic monomer should constitute from 48 to 68 percent by weight of the total weight of monomers and the monoethylenically unsaturated acid derivative should be present in amounts of from 2 to 10 percent by weight of the total weight of monomers.

The latexes may be prepared by known procedures for polymerization in aqueous emulsion. Typically, the monomers are dispersed in an aqueous solution of from about 0.05 to 5 percent of a polymerization catalyst, such as potassium persulfate and from about 0.05 to 5 percent of a pH stable surface-active agent capable of emulsifying the monomers. Many such surface-active agents are known. Polymerization is initiated by heating the emulsified mixture usually between 30° to 70° C. and is continued by maintaining the polymerizing emulsion at the selected temperature. After the polymerization has reached the desired conversion of monomer to polymer, the latex is filtered to remove any precoagulum and may be stabilized to storage by the addition of a small amount of known stabilizer.

The copolymerizable acid is of most utility when positioned near the surface of the latex polymer particles. Thus, the acid may be added subsequent to the initiation of polymerization. In such manner less copolymerizable acid is required to achieve the desired coating properties than when all of the acid is added initially to the polymerization recipe. However, whether added before or after initiation, the resulting polymer has the desirable properties previously mentioned.

The latexes of this invention require less emulsifying agent than do those prior known styrene-butadiene latexes. Consequently, there is considerably less foam noticed with these latexes. Where powered mixing and applying equipment is employed, foam can be a difficult problem with which to contend.

The latexes likewise exhibit unusual mechanical stability when compared to the prior known styrene-butadiene latexes. Again where latexes are handled by mechanical equipment in mixing and applying, mechanical stability is of paramount importance.

For practical reasons polymeric solids are important. Latexes having less than about 20 percent by weight of polymeric solids are uneconomical to prepare, to store, and to ship. When the latex has appreciably more than about 50 percent by weight of polymeric solids, it is usually sensitive to storage and to mechanical shear and may be coagulated prematurely. The coating thickness is easily controlled by the polymer solids of the latex.

For optimum film-forming characteristics it is desirable that the majority of the particles have individual diameters of from about 500 to 2500 Angstrom units. When the majority of the particles are outside of the expressed range, the latex will be less stable to storage and mechanical working and will have less film formability than a latex having particles within the expressed range. For the coating of metals, it has been found that the lower particle sizes within the range are preferable.

For various coating applications, it is desirable to have certain additives incorporated in the latex. Typical examples of such additives are metal chelating agents, pigments, stabilizers, fillers and natural binders. The coating compositions useful in this invention are meant to include such common additives which are included for a purpose other than film forming. These additives are intermixed with the latex by conventional blending methods. Thus, the additive may be finely comminuted and stirred into the latex or an aqueous emulsion of the additive may be blended with the latex.

For the coated papers of this invention it is frequently desirable to incorporate a minor amount of natural binders such as casein and starch to achieve certain coating properties. Such natural binders may constitute from about 10 to 95 percent of the weight of the combined adhesive.

It is an inherent advantage of the compositions that there is improved bonding of the film-forming constituents to solid additives, such as the pigments and fillers. This results in more uniform and permanent coloring and filling with less likelihood of leaching of the colorant or filler.

The coating compositions are well adapted for application to paper and other similar materials. The compositions may be applied by roller, brush, spray, dip, or other known coating methods. The resultant thin coatings are adequate for most applications. If slightly thicker coatings are desired, the compositions may be thickened with a small amount of a hydropholic colloid, such as the cellulose ethers.

The compositions are air dryable to a useful continuous coating. This is an unexpected result over the corresponding styrene-butadiene latexes which required baking to achieve an impervious coating. It should be understood, however, that these coatings may be baked if desired. Baking reduces the drying time significantly and results in a coating which is at least as effective as the air dried coating.

The coated papers resulting from these compositions exhibit excellent water resistance. Although the coatings may change from clear to opaque when wet, there is no loss of protection and the bond between coating and substratum is not weakened. That an interpolymer having hydrophilic pendant groups should have increased water resistance over a copolymer having no such groups is an unexpected result.

These coatings are clear in unmodified state or may be colored with pigments or dyes. The coatings exhibit good adhesion to paper and to solid additives. They also have a high gloss and may be printed in conventional manner.

The advantage of the compositions and the resultant coatings will be more apparent from the following illustrative examples wherein all parts and percentages are by weight.

Example 1

Several aqueous latexes were prepared by the emulsion polymerization at 50° C. of styrene, butadiene, and acrylic acid in the following percentages:

|  | 1 | 2 | 3 | 4 |
| --- | --- | --- | --- | --- |
| Styrene | 60 | 58 | 55 | 50 |
| Butadiene | 40 | 40 | 40 | 40 |
| Acrylic acid |  | 2 | 5 | 10 |

A pigment dispersion of clay coating colors was mixed into each latex at a ratio of 100 parts pigment solids to 15 parts latex solids. The blended dispersion was applied to bleached sulfite paper with a wire-wound rod, and air dried 24 hours. The pigment bonding was determined with a Warren print tester wherein a coated paper is taped to a metal plate and an inked cylinder brought into contact with the coated paper at increasing velocities until a velocity is reached where the ink will partially remove the coating from the paper. Each of the compositions was compared to a commercial styrenebutadiene paper coating latex formulation. In that comparison, Compositions 1 and 2 were found to be far inferior to the commercial formulation. Compositions 3 and 4 were the equivalent or slightly better than the commercial formulation.

Latexes having similar properties were prepared by substituting itaconic, maleic, fumaric, and cinnamic acids for the acrylic acid.

Example 2

Several latexes were prepared in the following monomer compositions:

|  | 5 | 6 | 7 | 8 |
| --- | --- | --- | --- | --- |
| Styrene | 55 | 53 | 30 | 10 |
| Acrylonitrile | 0 | 2 | 25 | 45 |
| Itaconic acid | 5 | 5 | 5 | 5 |
| Butadiene | 40 | 40 | 40 | 40 |

The latexes were prepared using 5 percent by weight of sodium N-methyl-N-oleoyl taurate, a commercially available anionic emulsifier. After polymerization and filtration to remove precoagulum, the latexes were found to have excellent mechanical stability.

A pigment dispersion was prepared, blended with each latex, and the resultant dispersion coated on paper as in Example 6. The pigment bonding was determined with the I.G.T. print tester with the following results which show the speed of the plate in feet per minute at 35 kilograms printing pressure with spring tension B. Minor picking is the point at which the plate starts to pick the ink off the paper as evidenced by pinholes. Major picking is the point at which the ink is completely removed from the paper. The greater the speed the more adherent is the coating.

| Latex | 5 | 6 | 7 | 8 |
|---|---|---|---|---|
| Speed to minor picking | 500 | 500 | (¹) | 480 |
| Speed to major picking | (¹) | (¹) | (¹) | 600 |

¹ No picking.

As can be seen, the latexes are about equivalent in adherence.

Attempts to replace all of the styrene with acrylonitrile have resulted in no useful latex whatever.

Example 3

Latexes were prepared according to the following recipe:

135 parts by weight of water,
2 parts by weight of a sodium salt of an alkyl aryl polyether sulfate, a surface-active agent sold commercially as Triton X-301,
0.7 part by weight of the dioctyl ester of sodium sulfosuccinic acid, a surface-active agent sold commercially as Aerosol OT,
0.5 part by weight of potassium persulfate, and
100 parts by weight of monomers according to the schedule listed in the following table.

Polymerization was initiated by heating the ingredients to 50° and was maintained for 40 hours with agitation by tumbling at 12 revolutions per minute. After polymerization, each latex was filtered through fine varnish filters. A pigment dispersion of clay coating colors was mixed into each latex at a ratio of 100 parts pigment solids to 15 parts latex solids. The blended dispersion was applied to bleached sulfite paper with a wire-wound rod and air dried 24 hours. The pigment bonding was determined by a standard pick test using an I.G.T. pick tester. In this test the coated paper is brought into contact with an inking wheel which is coated with a standard tack ink. The wheel is continuously accelerated until a predetermined amount of the paper coating has been lifted or picked or the paper substratum destroyed. The result is given as velocity in feet per second of the inking wheel. These results are listed under "dry pick" in the table.

In a modification of the pick test prior to contact of the paper with the inked roller, three drops of water were placed on the paper and distributed with a rubber squeegee. The test is then run as before. These results are listed under "wet pick" in the table. The wet pick test simulates offset printing. For coating formulation to be acceptable, it should have a wet pick of 50 or higher.

It should be noted that when the proportion of acidic monomer becomes greater than 10 percent (as indicated) in the compositions listed under "For Comparison" the latex composition fails to result in a coating which meets minimum standards acceptable for offset printing.

The latexes listed above were also flowed on cold rolled steep panels and air dried for 24 hours. When the acidic monomer concentration in the polymer was greater than 15 percent, rusting of the panels was noticeable and the coatings were discontinuous in containing pinholes and cracks. Further, on immersion of the dried panels into water the coatings made of compositions containing greater than 10 percent acidic monomer were more water sensitive as evidenced by whitening than were those containing less than 10 percent acidic monomer.

Example 4

Several latexes were prepared from the following recipe:

100 parts water,
1.1 parts by weight of sodium lauryl sulfate, a surface-active agent sold commercially as Duponol WAQ,
1.22 parts by weight of the dioctyl ester of sodium sulfosuccinic acid, a surface-active agent sold commercially as Aerosol OT,
0.7 part potassium persulfate,
0.8 part sodium sulfate,
95 parts per million Versene acid, and
100 parts of monomers according to the schedule listed in the following table.

Polymerization was accomplished by the method noted in the previous example. After polymerization, each latex was filtered. A pigment dispersion of No. 2 clay (paper coating grade) was mixed into each latex at a ratio of 100 parts clay to 24 parts latex to give a composition containing 60 percent total solids. The blended dispersion was applied to bleached sulfite paper with a No. 10 wire-wound rod to give 2 pounds per 1000 square feet coating weight.

The dried coated papers were tested according to the dry pick test mentioned in Example 3.

The coated papers were also tested according to a wet rub test. In this test procedure lacquer coated black photographic paper was cut into 6.5 inch strips and marked off in sections about 2 inches wide with a white pencil. The coating to be tested was placed along a section of the black paper and 3 drops of water added to the coated paper at about one inch intervals. A finger was placed on the water spot and without using pressure drawn from the coated paper across the black paper. This was repeated with each drop of water. The amount of coating transferred from the coated paper to the black paper was rated as none, slight, moderate, or great.

The results are shown in the following table.

TABLE I

| Example | Styrene | Butadiene | Itaconic acid | Acrylic acid | Solids | Dry "pick" (ft./min.) | Wet "pick" |
|---|---|---|---|---|---|---|---|
| For comparison: | | | | | | | |
| 10 | 60 | 40 | | | 40.0 | 460 | 20 |
| 11 | 45 | 40 | | 15 | 39.3 | 240 | 40 |
| 12 | 40 | 40 | | 20 | 40.5 | (¹) | |
| 13 | 30 | 40 | | 30 | 36.3 | (¹) | |
| 14 | 40 | 40 | 10 | 10 | 35.0 | (¹) | |
| Compositions of this invention: | | | | | | | |
| 15 | 58 | 40 | 2 | | 39.4 | 700 | 50-60 |
| 16 | 55 | 40 | 5 | | 37.8 | 700 | 50-60 |
| 17 | 58 | 40 | | 2 | 39.3 | 560 | 70 |
| 18 | 55 | 40 | | 5 | 40.4 | 480 | 60-70 |
| 19 | 50 | 40 | | 10 | 39.8 | 385 | 70 |
| 20 | 56 | 40 | 2 | 2 | 38.4 | 700 | 60 |
| 21 | 50 | 40 | 5 | 5 | 36.9 | 700 | 70 |
| 22 | 55 | 40 | (²) | (²) | 40.3 | 440 | 50-60 |

¹ Latex coagulated when added to pigment dispersion.
² 5 g. Methacrylic acid.

TABLE II

| Example | Styrene | Butadiene | Fumaric acid | Acrylic acid | Dry pick | Wet rub |
|---|---|---|---|---|---|---|
| For Comparison: | | | | | | |
| 23 | 47 | 47 | 4 | 2 | 400 | Moderate. |
| 24 | 42.7 | 51.3 | 4 | 2 | 300 | Great. |
| 25 | 43.6 | 52.4 | 3 | 1 | 400 | Moderate. |
| Compositions of this invention: | | | | | | |
| 26 | 48 | 48 | 3 | 1 | 600 | Slight. |
| 27 | 50.2 | 45.8 | 3 | 1 | 600 | None. |

Equivalent results in paper coating are noted when isoprene is substituted completely for the butadiene in the various latexes of these examples. As can be seen, the coating compositions of this invention provide paper coatings which are superior to any of similar polymeric compositions that have been known. Because of the inherent polymeric properties of the compositions of this invention, the paper coatings are useful not only in letterpress printing techniques but also in offset printing. The latexes are also utilizable in size press or machine coating. This latter in an area where the prior synthetic styrene-butadiene latexes have not heretofore been generally able to be used.

What is claimed is:

1. A coated paper having on at least one surface, a continuous adherent dried coating comprising (1) a major amount of a mineral pigment and (2) a minor amount of a binder, the principal film-forming constituent of which being an interpolymer of from 2 to 10 percent by weight of at least one monoethylenically unsaturated acid, from 30 to 50 percent by weight of an open-chain aliphatic conjugated diolefin having from 4 to 9 carbon atoms, and from 48 to 68 percent by weight of a third monomer consisting essentially of from 10 to 100 percent by weight of an alkenyl mononuclear aromatic monomer with the remainder made up of acrylonitrile.

2. The paper of claim 1 wherein said conjugated diolefin is butadiene.

3. The paper of claim 1 wherein said alkenyl mononuclear aromatic monomer is styrene.

4. The paper of claim 1 wherein said unsaturated acid is itaconic acid.

References Cited

UNITED STATES PATENTS

| | | | |
|---|---|---|---|
| 2,579,908 | 12/1951 | Davison et al. | 260—80.7 X |
| 2,698,318 | 12/1954 | Brown | 260—80.7 |
| 2,702,284 | 2/1955 | Brock | 260—29.7 X |
| 2,710,292 | 6/1955 | Brown | 260—80.7 X |
| 2,783,166 | 2/1957 | Deanin. | |
| 2,791,519 | 5/1957 | Gerke et al. | |
| 2,791,571 | 5/1957 | Wheelock et al. | |
| 2,807,597 | 9/1957 | Sonnenfeld et al. | 260—29.7 |

WILLIAM D. MARTIN, *Primary Examiner.*

M. R. LUSIGNAN, *Assistant Examiner.*